United States Patent
Takahashi

(10) Patent No.: US 6,721,250 B2
(45) Date of Patent: Apr. 13, 2004

(54) DISC REPRODUCING APPARATUS AND DISC REPRODUCING METHOD

(75) Inventor: Yorio Takahashi, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 141 days.

(21) Appl. No.: 09/936,724
(22) PCT Filed: Jan. 18, 2001
(86) PCT No.: PCT/JP01/00296
§ 371 (c)(1), (2), (4) Date: Nov. 28, 2001
(87) PCT Pub. No.: WO01/54124
PCT Pub. Date: Jul. 26, 2001

(65) Prior Publication Data
US 2003/0012100 A1 Jan. 16, 2003

(30) Foreign Application Priority Data
Jan. 18, 2000 (JP) ........................... 2000-009167

(51) Int. Cl.⁷ ................................. G11B 7/00
(52) U.S. Cl. ............... 369/47.46; 369/47.1; 369/47.28; 369/124.01
(58) Field of Search ............. 369/47.1, 47.28, 369/47.35, 47.46, 53.1, 53.18, 53.37, 53.42, 53.45, 59.1, 59.17, 124.01, 124.15, 44.25, 44.29, 44.34

(56) References Cited

U.S. PATENT DOCUMENTS 4,700,337 A 10/1987 Inagawa et al.
4,736,355 A * 4/1988 Kanamaru .............. 369/59.15
5,220,551 A * 6/1993 Tateishi et al. .......... 369/47.45
5,886,963 A * 3/1999 Abe et al. ................ 369/44.35

FOREIGN PATENT DOCUMENTS

AT 194435 7/2000
DE 59701983 8/2000

(List continued on next page.)

OTHER PUBLICATIONS

"Method for Select Rotational Speed of Compact Disk–Read Only Memory using Eject Button", IBM Technical Disclosure Bulletin, vol. 4, No. 01, Jan. 1998, New York, US, pp. 105–106.

(List continued on next page.)

Primary Examiner—Muhammad Edun
(74) Attorney, Agent, or Firm—Wenderoth, Lind & Ponack, LLP

(57) ABSTRACT

The present invention includes a playback means for playing back data on a disk; an audio output unit for outputting audio data as an audio signal to the outside when the audio data is played back by the playback unit; an audio level manipulation unit for manipulating the output level of the audio signal outputted from the audio output unit; a detection unit for detecting a set value of the audio level manipulation unit; and a rotation speed control unit for controlling the rotation speed of the disk which is played back by the playback unit on the basis of the set value detected by the detection unit only when no audio signal is outputted from the audio output unit. In this disk playback device, less influence is exerted upon the operation of the drive even when an erroneous operation is performed and the user can arbitrarily change the disk rotation speed by a simple operation without adding a new operation unit.

6 Claims, 5 Drawing Sheets

FOREIGN PATENT DOCUMENTS

| | | |
|---|---|---|
| EP | 946940 | 10/1999 |
| ES | 2150292 | 11/2000 |
| JP | 7-192391 | 7/1995 |
| JP | 11-203778 | 7/1998 |
| JP | 10-241282 | 9/1998 |
| JP | 11-328830 | 11/1999 |
| JP | 2000-021078 | 1/2000 |
| JP | 2000-507026 | 6/2000 |
| WO | 98/27549 | 6/1998 |

OTHER PUBLICATIONS

"CD–ROM drive, DM–3028/DM–5028 Toriatsukai Setsumeisho", Preku Staa K.K., Tokyo, Japan, Feb. 1994, the $1^{st}$ printing, pp. 31 and 48.

"Toshiba Video Naizo Colour TV. Toriatsukai Setsumeisho; Keimei 14V7G", Toshiba Corporation, Tokyo, Japan, The data is not displayed. However, the information given indicates the product (television receptor) was produced between Jul. and Dec. 1994.

* cited by examiner

DISC REPRODUCING APPARATUS AND DISC REPRODUCING METHOD

TECHNICAL FIELD

The present invention relates to a disk playback device for playing back information recorded on a disk such as a CD-ROM and, more particularly, to control over a rotation speed of a disk.

BACKGROUND ART

In recent years, the playback speed of the disk playback device such as a CD-ROM device has kept on increasing and, with this speeding-up, the disk rotation speed has also kept on increasing.

However, the increases in the disk rotation speed adversely cause vibrations or noises in the drive. More particularly, in media-exchangeable CD-ROM devices, DVD-ROM devices or the like, there are variations in mass eccentricities of media and the like, and accordingly excessive vibrations or noises sometimes occur depending on used media.

Thus, in recent years, it is common that when vibrations over a prescribed level occur, the maximum rotation speed of a disk is automatically reduced by a method in which a vibration sensor is mounted on a drive or vibrations are detected from a servo error signal or the like, thereby reducing the vibrations.

However, the vibrations and noises depend on users' senses, and the extents to which the users feel unpleasant differ according to the use environments, users' individual differences or the like. Further, there are certain variations in a vibration sensor mounted on a drive or a detection signal from a servo error signal for detecting vibrations, and the disk rotation speed is sometimes reduced though the user actually feels that the level is trivial.

Accordingly, as a device which arbitrarily reduces the disk rotation speed in accordance with an operation of a user who feels unpleasant, a disk playback device which can reduce the disk rotation speed by performing a prescribed operation to a disk ejection switch which is attached to the device is commercially available.

Hereinafter, this conventional disk playback device 61 which reduces the disk rotation speed using a disk ejection switch will be described with reference to FIG. 6.

FIG. 6 is a diagram for explaining the conventional disk playback device.

In FIG. 6, reference numeral 61 denotes a disk playback device according to this prior art. Numeral 12 denotes a host computer which issues a data playback request or the like to the disk playback device 61 as well as receives data which has been played back by the disk playback device 61.

Next, the structure of the disk playback device 61 will be described.

Numeral 101 denotes a disk on which various kinds of information data is recorded and which is exchangeably disposed. Numeral 102 denotes a disk motor for rotating the disk 101. Numeral 103 denotes a disk motor driving means for driving the disk motor 102 at a predetermined rotation speed. Numeral 104 denotes a playback means for playing back the various kinds of information data which is recorded on the disk 101. Numeral 105 denotes a volume control for adjusting an output level of an audio signal by a user operation. Numeral 106 denotes an audio output means for outputting audio data which has been played back by the playback means 104 as an audio signal. Numeral 107 denotes an interface means, which is connected with the host computer 12, for receiving the data playback request or the like from the host computer 12 as well as outputting data such as a program which has been played back by the playback means 104. Numeral 1003 denotes a disk ejection means for stopping the rotation of the disk 101 and ejecting the disk 101 from the disk playback device 61. Numeral 1004 denotes a disk ejection switch for outputting a switch operation which has been performed by a user. Numeral 110 denotes a control means for controlling respective components of the disk playback device 61. The control means 110 includes a switch operation analysis means 1001 for analyzing the switch operation of the disk ejection switch 1004, which has been performed by the user, and outputting a disk ejection command or a disk rotation speed control command; and a rotation speed control means 1002 for controlling the rotation speed of the disk 101 on the basis of a signal outputted from the switch operation analysis means 1001.

Next, control over the rotation speed of the disk 101 using the conventional disk playback device 61 will be described.

When a user operates the disk ejection switch 1004, the switch operation analysis means 1001 included in the control means 110 analyzes the operation of the disk ejection switch 1004 by the user. When the normal operation (for example, operation such as pushing the disk ejection switch 1004 once) is performed, the switch operation analysis means 1001 outputs a disk ejection command to the disk ejection means 1003, to stop the rotation of the disk 101 and eject the disk 101 outside of the device. On the other hand, when a specific operation (for example, operation such as continuing to press the disk ejection switch 1004 for a prescribed time or longer period) is performed, the switch operation analysis means 1001 outputs a command for reducing the rotation speed of the disk motor 102 to the rotation speed control means 1002, to reduce the rotation speed of the disk 101. To be more specific, when the user feels unpleasant due to vibrations or noises of the disk playback device 61, which result from the mass eccentricity of the disk 101 or the like, the user performs a specific operation using the disk ejection switch 1004 to output a command for reducing the rotation speed of the disk 101 to the rotation speed control means 1002. The rotation speed control means 1002 which has received the command for reducing the disk rotation speed controls the disk motor driving means 103 to reduce the rotation speed of the disk motor 102, thereby reducing noises or vibrations.

However, in the above-mentioned conventional disk playback device, a specific operation that is not the normal operation for disk ejection is performed to the disk ejection switch 1004 to reduce the rotation speed of the disk. Accordingly, there is a high risk of erroneous operations of the disk ejection switch 1004. Further, it is quite difficult to minutely set the degree of reducing the disk rotation speed, or restore the playback speed which has been once reduced to its previous speed. When this is to be realized, a complicated operation of the disk ejection switch 1004 by the user is further required, whereby the risk of erroneous operations of the switch is increased.

The present invention is made in view of the aforementioned problems and has for its object to provide a disk playback device which neither requires an additional component in the disk playback device nor affects a disk reading operation even when an erroneous operation is performed, and whose disk rotation speed can be arbitrarily changed by the user with a simple operation.

DISCLOSURE OF THE INVENTION

To attain the aforementioned object, a disk playback device according to an embodiment of the present invention comprises: a playback means for playing back data on a disk; an audio output means for outputting audio data as an audio signal to the outside when the audio data is played back by the playback means; an audio level manipulation means for manipulating an output level of the audio signal which is outputted by the audio output means; a detection means for detecting a set value of the audio level manipulation means; and a rotation speed control means for controlling a rotation speed of the disk which is played back by the playback means, and the rotation speed control means controls the rotation speed of the disk on the basis of the set value detected by the detection means.

According to the disk playback device of the present invention, the rotation speed is controlled on the basis of the set value in the audio level manipulation means, whereby the users can freely change the disk rotation speed with a simple operation. Further, the rotation speed of the disk is controlled using the audio level manipulation means, whereby the structure of the disk playback device can be produced easily and inexpensively without adding a new component for controlling the rotation speed of the disk.

According to a disk playback device of the disk playback device discussed above, the rotation speed control means controls the rotation speed of the disk on the basis of the set value detected by the detection means only when the audio signal is not outputted from the audio output means.

According to the disk playback device of the present invention, the playback speed of the disk is not changed while the audio signal is outputted. Thereby, the audio level can be changed using the volume control while the audio signal is outputted, and there can be provided a disk playback device which exerts less influence upon the playback operation of the disk even when an erroneous operation is performed while the audio signal is outputted.

According to a disk playback device of another embodiment of the present invention, further to the disk playback device discussed above, the audio level manipulation means is a variable-resistance volume control for changing the output level of the audio signal which is outputted from the audio output means.

According to the disk playback device of the present invention, the rotation speed of the disk is controlled using the variable-resistance volume control, whereby less influence is exerted upon the disk playback operation of the disk playback device even when an erroneous operation is performed, and the user can freely change the disk rotation speed with a simple operation. Further, by controlling the disk rotation speed using the variable-resistance volume control, the structure of the disk playback device can be produced easily and inexpensively without adding a new component for controlling the disk rotation speed.

According to a disk playback device of another embodiment of the present invention, further to the disk playback device discussed above, the audio level manipulation means is an electric volume control comprising a switch means; and an audio level set value storage means which can vary a set value by an operation of the switch means, and changes the output level of the audio signal outputted from the audio output means on the basis of the value in the audio level storage means.

According to the disk playback device of the present invention, the rotation speed of the disk is controlled using the electric volume control. Thereby, less influence is exerted upon the disk playback operation of the disk playback device even when an erroneous operation is performed, and the user can freely change the disk rotation speed with a simple operation. Further, by controlling the disk rotation speed using the electronic volume control, the structure of the disk playback device can be produced easily and inexpensively without adding a new component for controlling the disk rotation speed.

According to a disk playback device of another embodiment of the present invention, further to the disk playback device discussed above further comprises a disk moving means for placing a disk in a playable state; and rotation speed control means for performing control for playing back data on the disk at a preset rotation speed of the disk immediately after the power is turned on or immediately after the disk is placed in a playable state by the disk moving means.

According to the disk playback device of the present invention, data on a disk is played back at a rotation speed of the disk, which is arbitrarily preset when the power is turned on or when the data is played back immediately after the disk is placed in a playable state. Thereby, the disk rotation speed which has been changed by the user operation is reset after the power is turned off or the disk is ejected, and the playback can be always performed at a fixed disk rotation speed after the power is turned on or the disk is placed in a playable state.

According to a disk playback device of another embodiment of the present invention, further to the disk playback device discussed above, the preset rotation speed of the disk is a maximum rotation speed of the disk playback device.

According to the disk playback device of the present invention, data on a disk is played back at the maximum rotation speed of the disk playback device when the power is turned on or when the data is played back immediately after the disk is placed in a playable state. Thereby, the disk rotation speed which has been changed by the user operation is reset after the power is turned off or the disk is ejected, and the playback can be always performed at the maximum rotation speed of the disk playback device after the power is turned on or the disk is placed in a playable state.

According to a disk playback device of another embodiment of the present invention, further to the disk playback device discussed above, when the disk rotation speed with respect to the set value detected by the detection means is over the maximum rotation speed of the disk playback device, the rotation speed control means makes the set value the maximum rotation speed of the disk playback device.

According to the disk playback device of the present invention, even when a disk rotation speed with respect to a set value of the volume control, which has been changed by the operation of the volume control by the user is over the maximum rotation speed of the disk playback device, the disk rotation speed with respect to the changed set value is made the maximum rotation speed of the disk playback device. Thereby, even when the set value of the volume control is changed to any value, the disk rotation speed can be controlled on the basis of the disk rotation speed with respect to the set value of the volume control, whereby the user can freely change the disk rotation speed by the operation of the volume control.

A disk playback method according to an embodiment of the present invention comprises: a playback step of playing back data on a disk; an audio output step of outputting audio data as an audio signal to the outside when the audio data is played back in the playback step; an audio level manipulation step of manipulating an output level of the audio signal which is outputted in the audio output step; a detection step of detecting a set value in the audio level manipulation step;

and a rotation speed control step of controlling a rotation speed of the disk on the basis of the set value detected in the detection step only when the audio signal is not outputted in the audio output step.

According to the disk playback method of the present invention, the rotation speed is controlled on the basis of the set value in the audio level manipulation step, whereby less influence is exerted upon the disk playback operation of the disk playback device even when an erroneous operation is performed, and the user can freely change the disk rotation speed with a simple operation. Further, by controlling the disk rotation speed using the set value in the audio level manipulation step, the structure of the disk playback device can be produced easily and inexpensively without adding a new component for controlling the disk rotation speed.

BEST MODE FOR CARRYING OUT THE INVENTION

Embodiment 1

Hereinafter, a disk playback device according to a first embodiment of the present invention will be described with reference to FIGS. 1 and 3 to 5.

Figure 1:
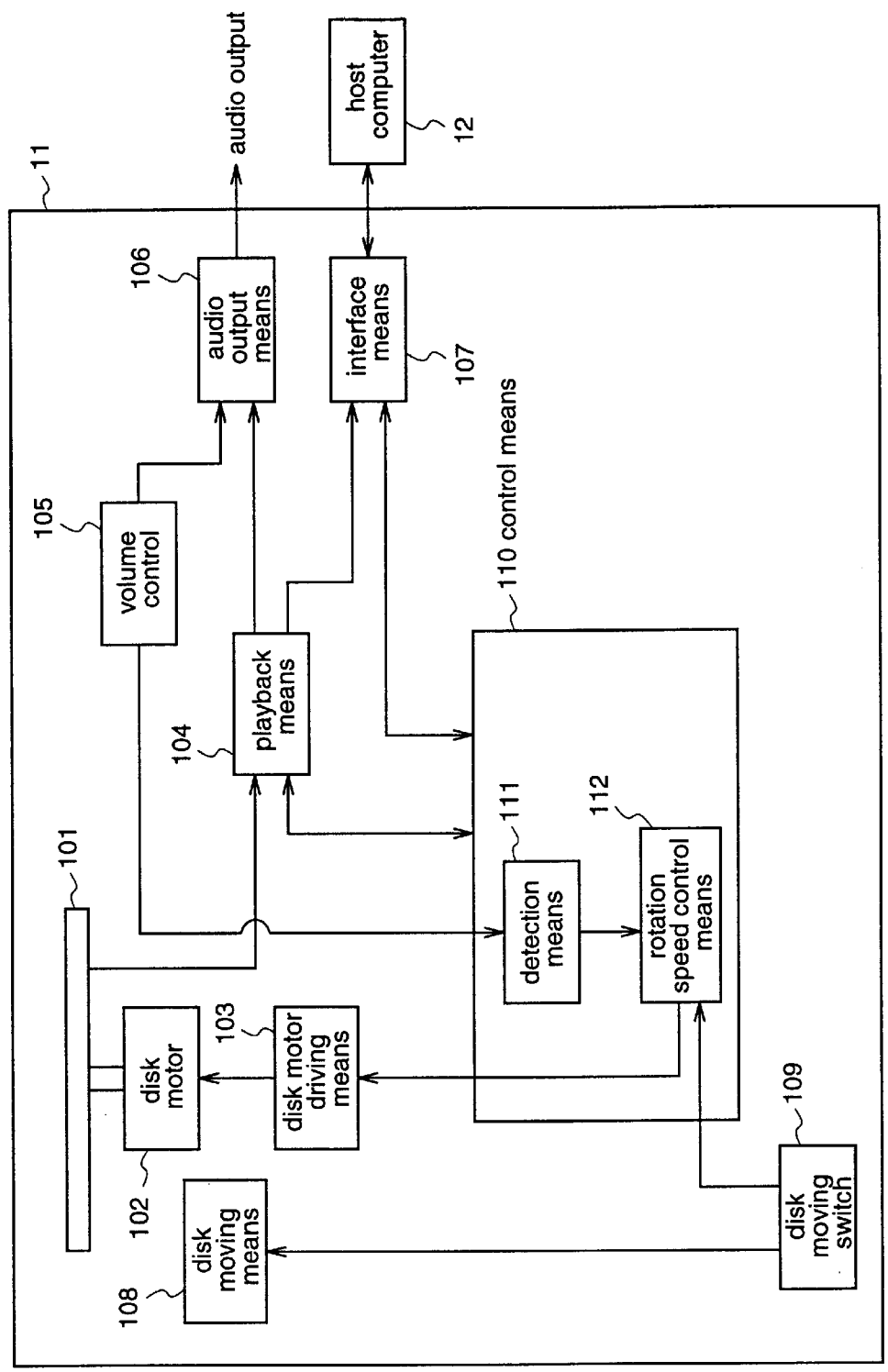
FIG. 1 is a block diagram illustrating an example of a disk playback device according to a first embodiment of the present invention.

FIG. 1 is a block diagram illustrating an example of the disk playback device according to the first embodiment. A description will be given taking a CD-ROM playback device which is one of the disk playback devices as an example.

In FIG. 1, numeral 11 denotes a disk playback device according to the invention. Numeral 12 denotes a host computer for issuing a data playback request or the like to the disk playback device 11 as well as receiving data which is outputted from the disk playback device 11.

Next, the structure of the disk playback device 11 will be described.

Numeral 101 denotes a disk on which various kinds of information data is recorded and which is displaced exchangeably. Numeral 102 denotes a disk motor for rotating the disk 101. Numeral 103 denotes a disk motor driving means for driving the disk motor 102 at a predetermined rotation speed. Numeral 104 denotes a playback means for playing back the various kinds of information data which is recorded on the disk 101. Numeral 105 denotes a variable-resistance volume control for adjusting an output level of an audio signal by a user's operation (hereinafter, referred to as a volume control). Numeral 106 denotes an audio output means for outputting audio data which has been played back by the playback means 104 as an audio signal. Here, the audio output means normally includes a first audio output means which varies an output level according to a value varied by the volume control 105, for example a headphones output circuit; and a second audio output means which does not vary the output level for some values varied by the volume control 105, for example a line-out output circuit or digital audio output circuit. Numeral 107 denotes an interface means, which is connected with the host computer 12, for receiving a data playback request or the like from the host computer 12 as well as outputting data such as a program which has been played back by the playback means 104. In this embodiment, the description is given of the case where the audio output means 106 and the interface means 107 are included as means for outputting data which has been played back by the playback means 104. However, it is not restricted to these means and any means can be used as long as the means can output data which has been played back by the playback means 104. Numeral 108 denotes a disk moving means for placing the disk 101 in a playable state. Numeral 109 denotes a disk moving switch for outputting a disk moving command to the disk moving means 108 by a user's operation or the like. Numeral 110 denotes a control means for controlling respective components of the disk playback device 11. The control means 110 includes a detection means 111 for detecting a set value of the volume control 105; and a rotation speed control means 112 for controlling the rotation speed of the disk 101 on the basis of the set value of the volume control 105, which is detected by the detection means 111, only when the audio signal is not outputted from the audio output means 106.

Next, the operation will be described with reference to FIG. 3.

Figure 3:
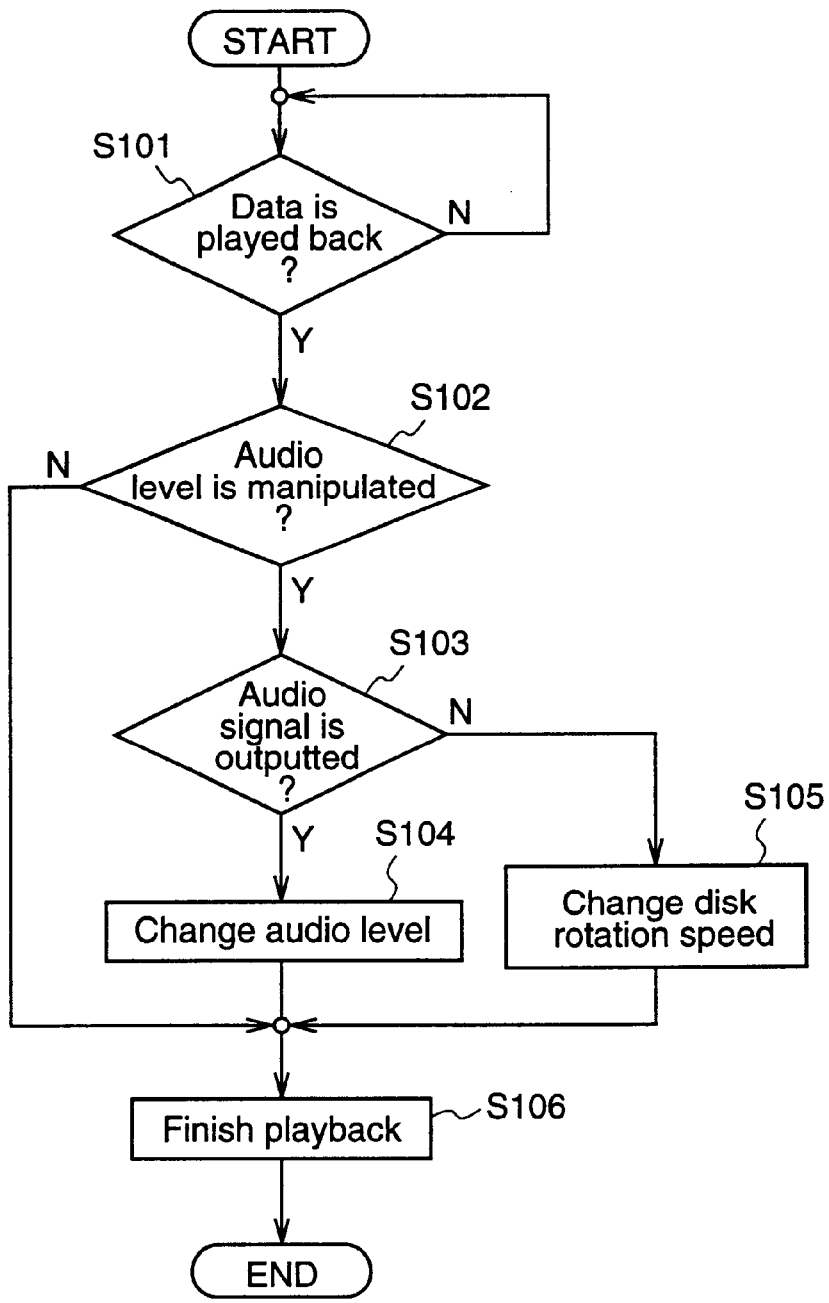
FIG. 3 is a flowchart showing the operation of the disk playback device according to the first embodiment.

FIG. 3 is a flowchart showing the operation of the disk playback device 11 according to the first embodiment.

(Step S101) The control means 110 which has received a disk playback command controls the playback means 104 to play back data recorded on the disk 101 at a preset rotation speed of the disk 101.

(Step S102) On the data playback, when the volume control 105 as an audio level manipulation means is operated by a user, the process proceeds to step S103. When the volume control 105 is not operated, the process proceeds to step S106.

(Step S103) The rotation speed control means 112 included in the control means 110 judges whether the audio output means 106 outputs an audio signal. When the audio output means 106 outputs an audio signal, the process proceeds to step S104. When the audio output means outputs no audio signal, the process proceeds to step S105. Here, the judgement as to whether an audio signal is outputted from the audio output means 106 is made for example on the basis of contents of data recorded on the disk 101 to be played, contents of the data playback request outputted from the host computer 12 or the like.

(Step S104) When the audio output means 106 outputs an audio signal, the control means 110 changes the output level of the audio signal outputted from the audio output means 106 on the basis of the set value of the volume control 105, which has been set by the operation of the volume control 105, and continues the data playback.

(Step S105) When the audio output means 106 outputs no audio signal, the rotation speed control means 112 changes the rotation speed of the disk driven by the disk motor driving means 103 on the basis of the set value of the volume control 105, which has been set by the operation of the volume control 105, and continues data playback. Here, the disk rotation speed is changed with reference to a set value of the volume control 105, which is set when the power is turned on or when the disk 101 is placed in a playable state, and the rotation speed of the disk 101 with respect to this reference set value (hereinafter, referred to as an initial set value) is previously set. The time when the disk is placed in a playable state is a time when the disk moving means 108 receives a disk moving command outputted from the disk moving switch 109 in accordance with the user's operation or the like and places the disk 101 in a playable state. For example, it is a time when the disk 101 is changed and a new disk 101 is placed in a playable state, or a time when the disk 101 is not changed but the disk 101 is once ejected from the disk playback device to the outside and thereafter placed in a playable state again, or the like.

(Step S106) The control means 110 finishes the processing after the data on the disk 101 to which the playback command has been issued are all played back.

The preset rotation speed of the disk 101 with respect to the aforementioned initial set value can be the maximum rotation speed of the disk playback device 11. Even when the disk rotation speed is changed by the operation of the volume control 105, the disk can be always played back at the maximum rotation speed of the disk playback device 11 after the power is turned on or the disk 101 is placed in a playable state.

In addition, the preset rotation speed of the disk 101 with respect to the above-mentioned initial set value can be a speed lower than the maximum rotation speed of the disk playback device 11. Even when the disk rotation speed is changed by the operation of the volume control 105, the disk can be always played back at a prescribed rotation speed after the power is turned on or the disk 101 is placed in a playable state. Besides, the vibrations or noises can be reduced more as compared to the above-mentioned case where the rotation speed of the disk playback device 11 is set at the maximum rotation speed, and further the user can also increase the rotation speed of the disk 101 as required.

As for the operation of the aforementioned disk playback device 11, the description has been given of only the case where the volume control 105 is operated while the disk 101 is played back. However, in a case where the volume control 105 is operated except when the disk 101 is played back, the disk playback device can be the one which changes only the audio signal output level, the one which changes only the disk rotation speed, the one which changes both of these, or the one which changes neither of these, on the basis of the operation of the volume control 105.

As for the disk change in this embodiment, it does not matter whether the disk 101 is actually changed, but only requires that the disk 101 is once ejected from the disk playback device 11 to the outside.

As described above, data on the disk 101 is played back at a rotation speed of the disk 101 which has been arbitrarily preset when the power is turned on or when data is played back immediately after the disk 101 is placed in a playable state. Thereby, the playback speed which has been changed by the user's operation is reset after the power is turned off or the disk 101 is ejected, and the playback can be always performed at a fixed rotation speed of the disk 101 after the power is turned on or the disk 101 is placed in a playable state.

Next, how the control of the rotation speed of the disk 101 is performed will be specifically described with reference to FIGS. 4 and 5.

In a case where audio data is not played back in the disk playback device 11 according to the present invention, when the set value of the volume control 105 is changed by the operation of the volume control 105 by the user, the detection means 111 included in the control means 110 detects the changed set value of the volume control 105, and outputs the changed set value to the rotation speed control means 112. The rotation speed control means 112 controls the rotation speed on the basis of the set value detected by the detection means 111 and the initial set value which is a set value when the power is turned on or after the disk 101 is placed in a playable state.

At this time, when the rotation speed of the disk 101 with respect to the set value of the volume control 105, which has been changed by the operation of the volume control 105 by the user, is higher than the maximum rotation speed of the disk playback device 11, since the rotation speed of the disk 101 cannot be increased to a speed over the maximum rotation speed of the disk playback device 11, the rotation speed of the disk 101 with respect to the changed set value of the volume control 105 is made the maximum rotation speed of the disk playback device 11. Then, when the set value of the volume control 105 is changed to be decreased by the operation of the volume control 105 by the user, the rotation speed of the disk 101 is decreased with reference to the set value of the volume control 105, which is the maximum rotation speed of the disk playback device 11.

Figure 4:
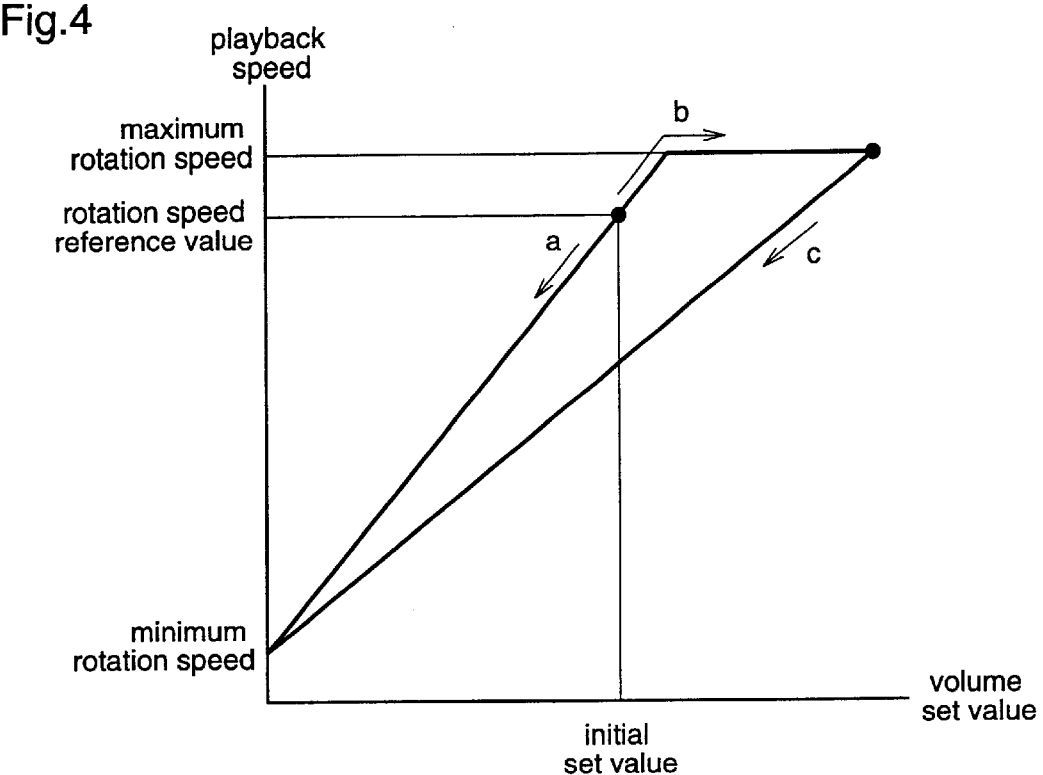
FIG. 4 is a diagram showing changes in the disk rotation speed with respect to volume set values when a reference value of the disk rotation speed is set at a speed lower than the maximum rotation speed of the disk playback device according to the first embodiment.
Figure 5:
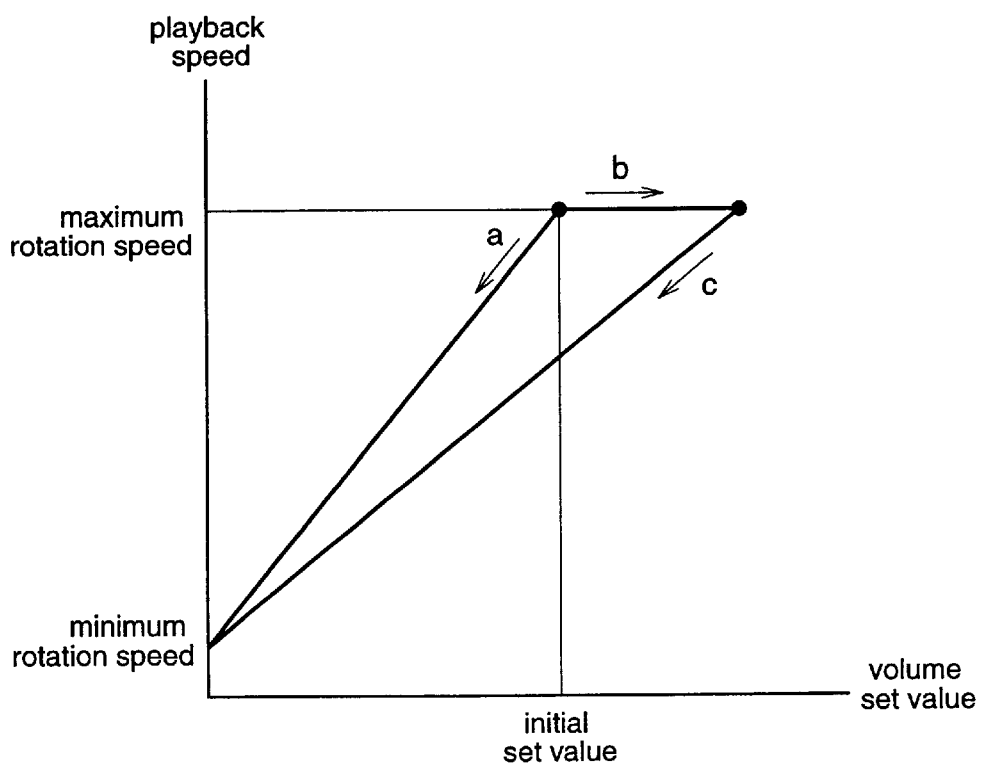
FIG. 5 is a diagram showing changes in the disk rotation speed with respect to volume set values when a reference value of the playback speed is set at the maximum rotation speed of the disk playback device according to the embodiment.
Figure 6:
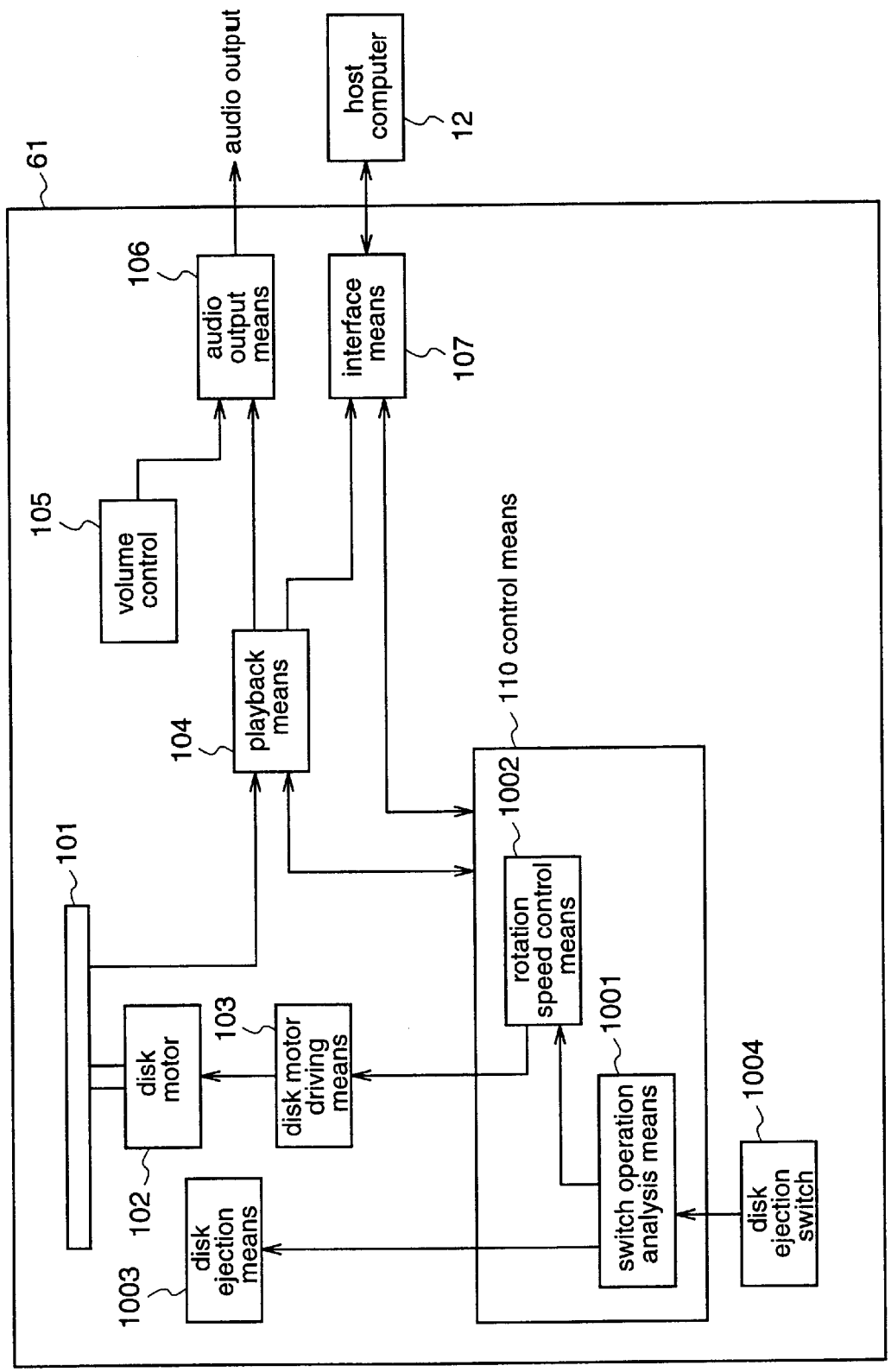
FIG. 6 is a block diagram illustrating an example of a prior art disk playback device.

FIGS. 4 and 5 are diagrams showing changes in the playback speed when the volume control 105 is operated. FIG. 4 is a diagram showing a case where the reference value of the playback speed is set at a speed slightly lower than the maximum rotation speed of the disk playback device 11. FIG. 5 is a diagram showing a case where the reference value of the playback speed is set at the maximum rotation speed of the disk playback device 11. In either case, the playback is performed at a preset rotation speed of the disk 101 immediately after the power is turned on or immediately after the disk is changed.

Thereafter, when the user operates the volume control 105 to change the set value of the volume control 105 to be decreased, the rotation speed of the disk 101 is varied with characteristics "a". On the other hand, when the user operates the volume control 105 to change the set value of the volume control 105 to be increased, the rotation speed of the disk 101 has characteristics "b". That is, even when the set value of the volume control 105 is set at a value exceeding the maximum speed of the drive, the rotation speed of the disk 101 remains the maximum rotation speed of the disk 101.

When the set value of the volume control 105 is set once at a value exceeding the maximum speed of the drive and thereafter the user operates the volume control 105 to change the set value of the volume control 105 to be decreased, the rotation speed of the disk 101 is varied from the set value which indicates the maximum rotation speed of the disk 101 with characteristics "c".

Accordingly, even when the set value of the volume control 105 is changed to any value by the operation of the volume control 105 by the user, the rotation speed of the disk can be controlled on the basis of the rotation speed of the disk with respect to the set value of the volume control 105, whereby the user can change the disk rotation speed freely by the operation of the volume control 105.

In addition, when the disk rotation speed is controlled using the volume control 105, the structure of the disk playback device 11 can be produced easily and inexpensively without adding a new component for controlling the rotation speed of the disk 101.

Further, when the rotation speed of the disk is controlled using the volume control 105, influences exerted upon the playback operation of the disk 101 in the disk playback device 11 are small even when an erroneous operation is performed, and the user can freely change the rotation speed of the disk by a simple operation.

Further, when the playback speed of the disk is not changed while the audio signal is outputted, the audio level can be changed using the volume control 105 while the audio signal is outputted, resulting in a disk playback device 11 which exerts less influence upon the playback operation of the disk 101 even when an erroneous operation is performed while the audio signal is outputted.

In this embodiment, the description has been given of the apparatus which plays back data on the disk 101 at a rotation speed of the disk 101, which is arbitrarily preset when the power is turned on or when data is played back immediately after the disk 101 is placed in a playable state However, it goes without saying that the present invention is not limited to this apparatus, and the apparatus can be for example the one which plays back data on the disk 101 at a rotation speed of the disk 101, which was set most recently by the user, for example when the power is turned on or when data is played back immediately after the disk 101 is placed in a playable state, or the one which plays back data on the disk 101 at an arbitrarily preset rotation speed of the disk 101 every time it plays back the disk, or the like.

Figure 2:
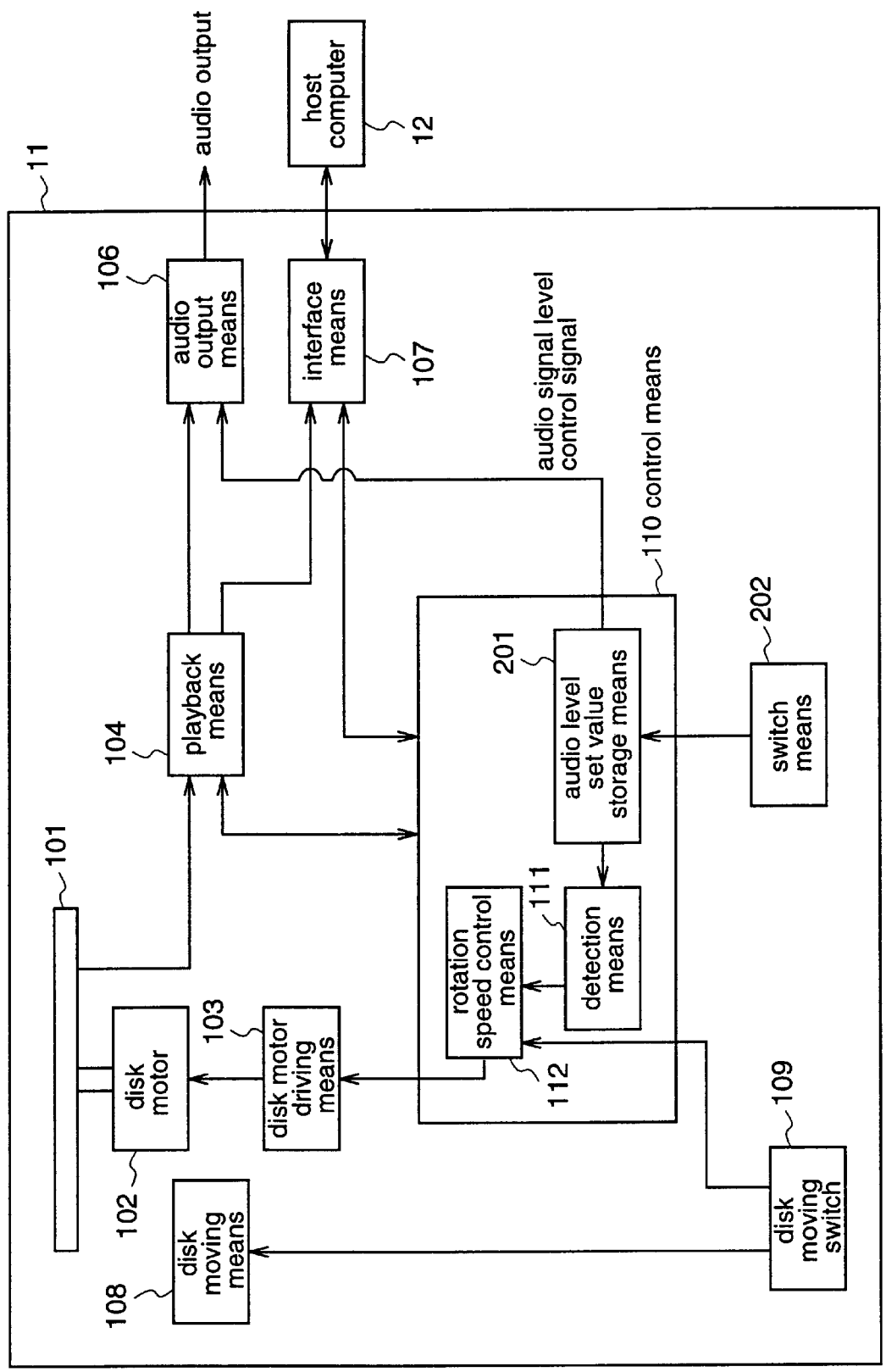
FIG. 2 is a block diagram illustrating an example of the disk playback device according to the first embodiment.

Further, in this embodiment, the description has been given of the case where the set value is varied using the variable-resistance volume control 105 as the audio level manipulation means, to control the disk rotation speed. However, it is needless to say that the present invention is not limited to this apparatus, and the same effects as those of the present invention can be obtained for example even in an apparatus in which an electronic volume control is used as the audio level manipulation means, i.e., an audio level set value storage means 201 and an switch means 202 are included as shown in FIG. 2, the audio level set value storage means 201 varies the set value on the basis of the operation of the switch means 202, and the electronic volume which outputs an audio signal level control signal or a rotation speed control signal is used.

Further, in this embodiment, the description has been given taking a CD-ROM playback device as an example, while a disk playback device 11 which includes means having a set value which can be arbitrarily changed by the user by means of some volume or electronic volume can obtain the same effects as those of the present invention.

Further, in this embodiment, the description has been given of the case where the rotation speed of the disk is controlled only when the audio output means 106 does not output the audio signal. However, for example in a case where the playback frequency of audio data is lower, the apparatus can control the rotation speed of the disk even when the audio output means outputs the audio signal.

INDUSTRIAL AVAILABILITY

The disk playback device according to the present invention comprises the playback means for playing back data on a disk; the audio output means for outputting audio data as an audio signal to the outside when the audio data is played back by the playback means; the audio level manipulation means for manipulating the output level of the audio signal which is outputted by the audio output means; the detection means for detecting a set value of the audio level manipulation means; and the rotation speed control means for controlling the rotation speed of the disk on the basis of the set value detected by the detection means only when the audio output means does not output the audio signal, and it is useful because influences exerted upon the drive operation are small even when an erroneous operation is performed, and the user can arbitrarily increase or decrease the rotation speed of the disk by a simple operation, without adding a new operation means.

What is claimed is:

1. A disk playback device comprising:
a playback means for playing back data on a disk;
an audio output means for outputting audio data as an audio signal externally to the disk playback device when the audio data is played back by said playback means;
an audio level manipulation means for manipulating an output level of the audio signal which is outputted by said audio output means;
a detection means for detecting a set value of said audio level manipulation means; and
a rotation speed control means for controlling a rotation speed of the disk which is played back by said playback means,
wherein said rotation speed control means is operable to control the rotation speed of the disk on the basis of the set value detected by said detection means, and
wherein said rotation speed control means is operable to control the rotation speed of the disk on the basis of the set value detected by said detection means only when the audio signal is not outputted from said audio output means.

2. A disk playback device comprising:
a playback means for playing back data on a disk;
an audio output means for outputting audio data as an audio signal externally to the disk playback device when the audio data is played back by said playback means;
an audio level manipulation means for manipulating an output level of the audio signal which is outputted by said audio output means;
a detection means for detecting a set value of said audio level manipulation means; and
a rotation speed control means for controlling a rotation speed of the disk which is played back by said playback means,
wherein said rotation speed control means is operable to control the rotation speed of the disk on the basis of the set value detected by said detection means, and
wherein said audio level manipulation means comprises a variable-resistance volume control operable to change the output level of the audio signal which is outputted from said audio output means.

3. A disk playback device comprising:
a playback means for playing back data on a disk;
an audio output means for outputting audio data as an audio signal externally to the disk playback device when the audio data is played back by said playback means;
an audio level manipulation means for manipulating an output level of the audio signal which is outputted by said audio output means;
a detection means for detecting a set value of said audio level manipulation means; and
a rotation speed control means for controlling a rotation speed of the disk which is played back by said playback means,
wherein said rotation speed control means is operable to control the rotation speed of the disk on the basis of the set value detected by said detection means, and wherein said audio level manipulation means comprises an electric volume control comprising a switch means and an audio level set value storage means which can vary a set value by an operation of said switch means, and is operable to change the output level of the audio signal outputted from said audio output means on the basis of the set value in said audio level set value storage means.

4. A disk playback device comprising:

a playback means for playing back data on a disk;

an audio output means for outputting audio data as an audio signal externally to the disk playback device when the audio data is played back by said playback means;

an audio level manipulation means for manipulating an output level of the audio signal which is outputted by said audio output means;

a disk moving means for placing a disk in a playable state;

a detection means for detecting a set value of said audio level manipulation means; and a rotation speed control means for controlling a rotation speed of the disk which is played back by said playback means, wherein said rotation speed control means is operable to control the rotation speed of the disk on the basis of the set value detected by said detection means, and wherein said rotation speed control means is operable to perform control for playing back data on the disk at a preset rotation speed of the disk immediately after the power is turned on or immediately after the disk is placed in a playable state by said disk moving means.

5. The disk playback device of claim 4, wherein said preset rotation speed of the disk is a maximum rotation speed of the disk playback device.

6. A disk playback device comprising:

a playback means for playing back data on a disk;

an audio output means for outputting audio data as an audio signal externally to the disk playback device when the audio data is played back by said playback means;

an audio level manipulation means for manipulating an output level of the audio signal which is outputted by said audio output means;

a detection means for detecting a set value of said audio level manipulation means; and a rotation speed control means for controlling a rotation speed of the disk which is played back by said playback means, wherein said rotation speed control means is operable to control the rotation speed of the disk on the basis of the set value detected by said detection means, and wherein when the disk rotation speed with respect to the set value detected by said detection means is over the maximum rotation speed of the disk playback device, said rotation speed control means makes the set value the maximum rotation speed of the disk playback device.

* * * * *